United States Patent [19]

Ulander

[11] Patent Number: 4,664,164
[45] Date of Patent: May 12, 1987

[54] LATHE CUTTING TOOL SUPPORT AND SUCTION CLEANING DEVICE FOR WOOD LATHES

[76] Inventor: Lennart Ulander, Carlgrensvagen 1, 892 00 Domsjo, Sweden

[21] Appl. No.: 704,798

[22] Filed: Feb. 25, 1985

[30] Foreign Application Priority Data

Feb. 24, 1984 [SE] Sweden ............................ 8401009

[51] Int. Cl.⁴ .............................................. B27C 7/06
[52] U.S. Cl. .................................................... 142/49
[58] Field of Search ....................... 142/49; 144/252 R

[56] References Cited

U.S. PATENT DOCUMENTS

| | | | |
|---|---|---|---|
| 483,970 | 10/1892 | Thomas | 144/252 R |
| 1,193,525 | 8/1916 | Dosch | 144/252 R |
| 3,007,501 | 11/1961 | Mundell et al. | 144/252 R |
| 4,255,995 | 3/1981 | Connor | 144/252 R |

Primary Examiner—Leonidas Vlachos

[57] ABSTRACT

A lathe cutting tool support and suction cleaning device for woodlathes is provided, comprising a box enclosure having an open interior for reception of wood cuttings generated by a lathe cutting tool working on a wood workpiece, the box enclosure being elongated to extend for at least a substantial portion of the long dimension or length of the wood workpiece, the box having at least a portion of one side formed to support a lathe cutting tool in working against the wood workpiece lengthwise thereof; an elongated opening in close juxtaposition to the side support communicating into the interior of the box for passage of wood cuttings generated by the lathe cutting tool into the interior; and a suction conduit communicating into the interior of the box for removal of wood cuttings therefrom.

7 Claims, 3 Drawing Figures

LATHE CUTTING TOOL SUPPORT AND SUCTION CLEANING DEVICE FOR WOOD LATHES

Supports for the lathe cutting tool of wood lathes are usually made in one piece with a plane horizontal upper side serving as a support for the cutting tool. The lower and narrower part of the tool support is usually attached to a guide extending lengthwise along the lathe. These tool supports are often shorter than the workpiece, and therefore have to be moved along the workpiece as the tool works its way down the support.

The working of the lathe cutting tool against the wood workpiece generates a considerable volume of wood cuttings, which have to be collected and removed. This is done by means of a shield, which is arched over the upper side, back side and under side of the lathe, and guides the wood cuttings into a suction conduit connected, for example, to a motor driven centrifugal blower. This type of collection device is however effective only for particles large enough to be collected by gravity flow along the shield. The finest particles, which have a tendency to become entrained in air, escape, and can create a cloud of dust surrounding the lathe.

In accordance with the invention, this difficulty is overcome by combining a lathe cutting tool support with a suction cleaning device, and forming the device in a box enclosure having an open interior for reception of the wood cuttings generated by the lathe cutting tool working against the wood workpiece. The box enclosure is elongated to extend for at least a substantial portion of the long dimension or length of the wood workpiece whether this be elongated or circular, or indeed of any straight or curved contour. At least a portion of one side of the box is formed to support the lathe cutting tool in working against the wood workpiece, while traveling lengthwise along the lathe. The box is provided with an elongated opening in close juxtaposition to the side support, communicating into the interior for passage of wood cuttings generated by the lathe cutting tool into the interior; and a suction conduit communicating into the interior of the box, for removal of wood cuttings therefrom. Application of suction through the suction conduit draws air and wood cuttings into the elongated opening, and the resulting air currents in close juxtaposition to the cutting tool act also to prevent escape of even the finest dust particles that tend to become entrained in air. All wood cuttings of any size are collected in the interior of the box and removed. At the same time, the box can be sufficiently elongated at to extend the full length of the lathe, and thus does not require moving with the cutting tool along the workpiece during the cutting.

The drawings show preferred embodiments of the invention.

Figure 1:
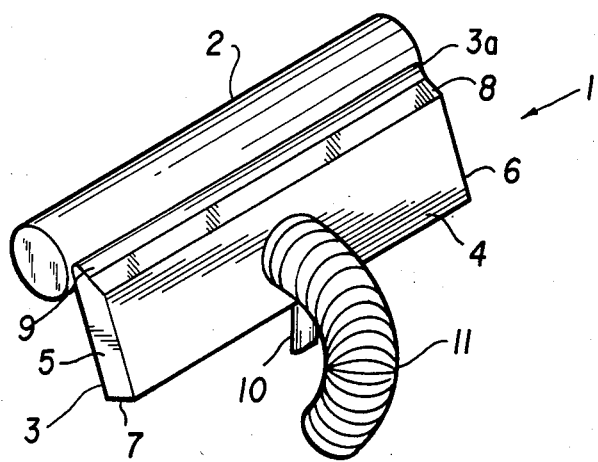
FIG. 1 shows one embodiment in which the elongated opening is in the form of a slot, and both the elongated opening and the tool support are at the top of the box.
Figure 2:
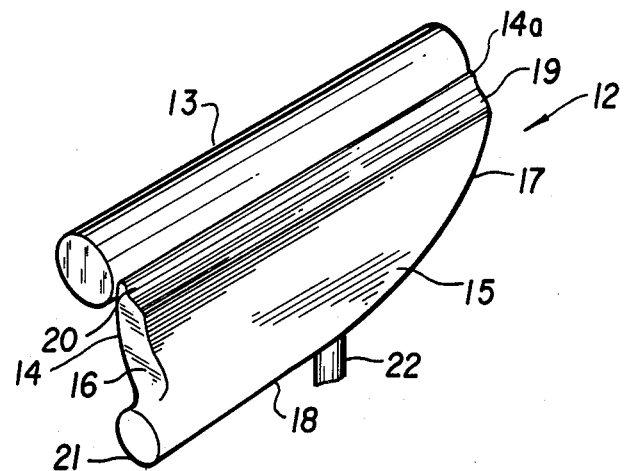
FIG. 2 shows another embodiment similar to that of FIG. 1, but in which the box is curved along the bottom side, so as to aid in directing the collected wood cuttings to the suction tool for withdrawal.
Figure 3:
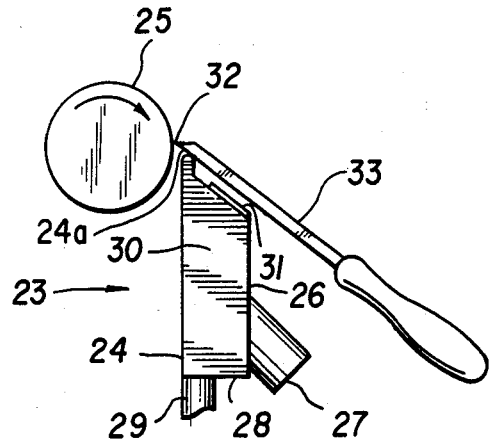
FIG. 3 shows a third embodiment in which both ends of the box are curved, so as to direct the wood cuttings towards the center of the box, where they are withdrawn by the suction tool.

As seen in FIG. 1, the device 1 of the invention is in close juxtaposition to the wood workpiece 2 to be cut by the cutting tool (not shown but seen in FIG. 3). In this case, the device is in the shape of a box whose sides define a parallelopiped, with a long side 3 beside the workpiece 2, an opposite side 4, not quite so wide as the side 3, and two gable ends 5 and 6, a bottom side 7, and a top side 8. The sides 3 and 8 together define a support 3a for the cutting tool, as seen in FIG. 3. The support extends beyond the side 8, as seen in FIG. 2, so that the cutting tool can be put at any desired angle to the workpiece, again as seen in FIG. 3. A slot 9 extends lengthwise of the top 8, from end to end of the box, directly beside the support 3a.

The device is attached to the lathe at the bar 10, for example, to one of the guides of the lathe.

The side 4 has an aperture to which is fixed one end of the flexible suction conduit 11, the other end of which is attached to a suction device, for example, a centrifugal blower driven by an electric motor. The open area of conduit 11 should be equal to the open area of the slot 9, and preferably larger. It is especially advantageous if the suction conduit 11 has twice the open area of the slot 9.

When the cutting tool is working against the workpiece 2, it rests on the upper edge of the support 3a, and moves lengthwise along the support, from one end to the other of the workpiece 2. The wood cuttings that are formed are thrown outwardly from the rotating workpiece in the vicinity of the tool. Upon application of a sufficient suction to slot 9 via the conduit 11, the velocity of the air stream through the slot 9 into the open interior of the box 1 is high enough that the wood cuttings are drawn into the slot, and the interior of the box, whence they are withdrawn through the conduit 11, and collected in a suitable receptacle (not shown). The side 3 has got to be strong enough to support the wood cutting tool and preferably therefore is thicker than the other sides of the box. The support has to be rigid, for accurate and precise working against the workpiece.

As shown in FIG. 1, the gable ends 5,6 form an acute angle with the support 3a, and fall away from the support towards the side 4. This facilitates placing the cutting tool at any desired angle to the workpiece. However, if desired, the ends 5 and 6 can also be at right angles to the sides 3,4.

In the embodiment of the invention shown in FIG. 2 the workpiece 13 is shown in close juxtaposition to the device 12 of the invention. Here, the box has a side 14 adjacent the workpiece, a side 15 opposite side 14, and gable ends 16,17, a bottom 18, and a top 19. The side 14 with the top 19 forms a support 14a for the cutting tool, which rests on it in the manner shown in FIG. 3, and this support extends lengthwise of the device and of the workpiece. Directly beside the support 14a is an elongated slot 20, which opens into the open interior of the box.

As seen in FIG. 2, the side 15 and the gable end 17 are curved so as to direct the wood cuttings collected therein from the slot 20 towards the outlet 21, to which is attached a suction conduit in the manner shown in FIG. 1, leading to a suction device, such as a centrifugal blower. Such shape of the box facilitates withdrawal of all of the wood cuttings from the interior of the box.

In the embodiment shown in FIG. 3, seen from one end, the device 23 is in immediate juxtaposition to the workpiece 25. The device is in the form of a box with a side 24 adjacent the workpiece, an opposite side 26, and two gable ends of which only end 30 is shown in the Figure. In this case, both ends 30 and the side 26 are curved towards the center of the box, and the suction outlet tube 27 is at the center of the box, so as to direct the wood cuttings towards the center to facilitate their withdrawal through tube 27. The device is fastened to the lathe by way of the support bar 29 at the bottom.

The box thus has sides 24 and 26, ends 30, a bottom 28 and a top 31. The sides 24 and top 31 define a tool support 24a, against which the cutting tool 33 rests. Extending lengthwise of the box and immediately beside the base of the support is an elongated slot 32, leading into the open interior of the box, for collection of wood cuttings. The top support 24a is preferably rounded off, to facilitate placing the cutting tool 33 at any desired angle to the workpiece. Here also the support 24a is made strong enough to support the tool, and is thicker than the other side.

As shown in the drawings, the sides of the box adjacent the workpiece and opposite thereto are parallel, but it is not necessary that these sides be parallel. They can be at an angle to each other, preferably with the distance or spacing between the sides less at the top than at the bottom of the box.

In the embodiments shown in the drawings, only one outlet for connection to the suction source is shown. In the case of elongated boxes, it is however frequently desirable to provide more than one connection to the suction, and for this purpose, suction conduits of the type of 11 can be attached at several locations along the length of the box, such as, for example, at each end and in the central portion, or at several length portions and at the center, depending upon how long the box is.

It is also possible to provide several slots 9, 20, 32, not only in the top of the box but also in the side 3, 14, 24 adjacent the workpiece to aid in complete collection of wood cuttings.

The device can be attached movably or immovably to the lathe. While the design makes it possible to make the box as long as the lathe, it may sometimes be desirable to use a shorter box, and arrange to move the box along the lathe with the cutting tool, as in the prior art devices.

The device of the invention can be made of any suitable material, such as, for example, metal or plastic, for example, iron, aluminum, steel, polyethylene, polypropylene, polyvinyl chloride, polycarbonate, polytetrafluoroethylene, phenol-formaldehyde, or melamine-formaldehyde resins.

Having regard to the foregoing disclosure, the following is claimed as the patentable and inventive embodiments thereof:

1. A lathe cutting tool support and suction cleaning device for wood lathes having a workpiece-supporting structure for retaining an elongated wood workpiece in position for working by a lathe cutting tool, comprising:
   (1) a box enclosure and receptacle having an open interior for reception of wood cuttings generated by a lathe cutting tool working on an elongated wood workpiece supported on the lathe;
   (2) the box enclosure and receptacle being elongated to extend for at least a substantial portion of the long dimension or length of the wood workpiece supported on the lathe;
   (3) the box having an elongated top, an elongated bottom, two elongated sides and two narrow ends, at least a portion of the top being formed as a narrow ledge extending the length of the box, to support a lathe cutting tool in working against the wood workpiece lengthwise thereof;
   (4) an elongated opening in the box substantially coextensive in length with the narrow ledge, and in close juxtaposition to the narrow ledge, and to a lathe cutting tool in working against the wood workpiece lengthwise thereof, communicating into the interior of the box for passage of wood cuttings generated by the lathe cutting tool into the interior; and
   (5) a suction conduit communicating into the interior of the box for removal of wood cuttings therefrom.

2. A lathe cutting tool support and suction cleaning device for wood lathes according to claim 1, in which the narrow ledge projects beyond the side of the box and the elongated opening.

3. A lathe cutting tool support and suction cleaning device for wood lathes according to claim 1, in which the top, bottom and sides of the box define a parallelopiped having gable ends.

4. A lathe cutting tool support and suction cleaning device for wood lathes according to claim 1 in which box enclosure defines a parallelopiped having one straight gable side and one curved gable side.

5. A lathe cutting tool support and suction cleaning device for wood lathes according to claim 1, in which box enclosure defines a parallelopiped having two curved gable sides.

6. A lathe cutting tool support and suction cleaning device for wood lathes according to claim 1, in which the opening is a slot extending along the base of the narrow edge for the length of the box.

7. A wood lathe comprising a frame; means for rotatably holding an elongated wood workpiece on the frame; means for rotating the workpiece; a lathe cutting tool for working on the workpiece; and a lathe cutting tool support and suction cleaning device for wood lathes having a workpiece-supporting structure for retaining an elongated wood workpiece in position for working by a lathe cutting tool, comprising:
   (1) a box enclosure and receptacle having an open interior for reception of wood cuttings generated by a lathe cutting tool working on an elongated wood workpiece supported on the lathe;
   (2) the box enclosure and receptacle being elongated to extend for at least a substantial portion of the long dimension or length of the wood workpiece supported on the lathe;
   (3) the box having an elongated top, an elongated bottom, two elongated sides and two narrow ends, at least a portion of the top being formed as a narrow ledge extending the length of the box, to support a lathe cutting tool in working against the wood workpiece lengthwise thereof;
   (4) an elongated opening in the box substantially coextensive in length with the narrow ledge, and in close juxtaposition to the narrow ledge, and to a lathe cutting tool in working against the wood workpiece lengthwise thereof, communicating into the interior of the box for passage of wood cuttings generated by the lathe cutting tool into the interior; and P1 (5) a suction conduit communicating into the interior of the box for removal of wood cuttings therefrom.

* * * * *